Aug. 21, 1934.     W. B. KING     1,970,891
SALT SHAKER
Filed Oct. 1, 1932
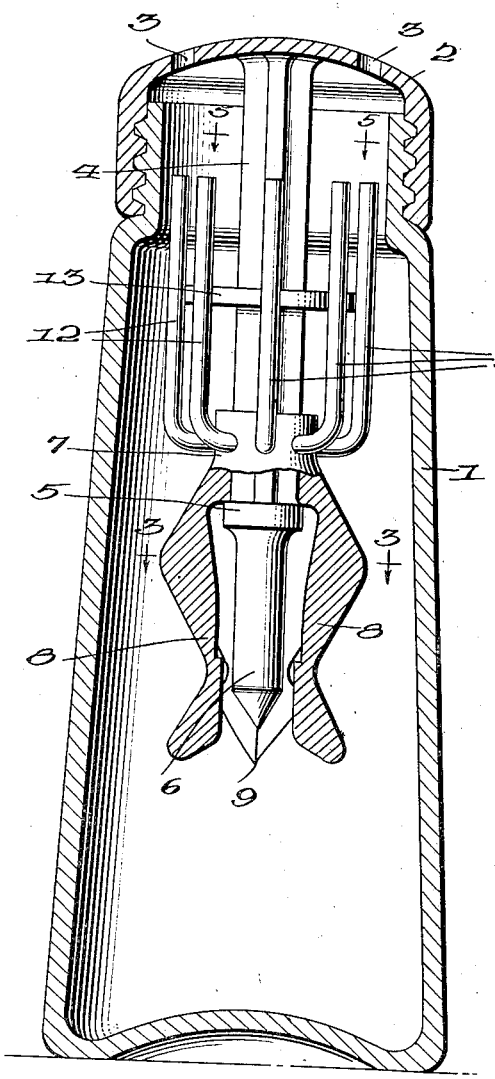

Patented Aug. 21, 1934

1,970,891

UNITED STATES PATENT OFFICE 1,970,891

SALT SHAKER

Wendell B. King, West Palm Beach, Fla., assignor to King Davis Corporation, West Palm Beach, Fla., a corporation of Florida Application October 1, 1932, Serial No. 635,813

6 Claims. (Cl. 65—57)

This invention relates to an improvement in salt shakers.

The object of the invention is to provide for breaking up the lumps of salt and effecting free flowing of the salt in the salt shaker even when the salt is damp and would cake or otherwise obstruct the openings through the cap.

My invention utilizes a plunger having a weight attached thereto and the plunger carries prongs which extend upwardly and are adapted to pass through the openings in the cap, so as to keep said openings clear and unobstructed while the weight which carries the prongs has downwardly extended portions which serve to break up the lumps of salt in the lower portion of the shaker. In this manner by reciprocating the plunger in the act of shaking, the salt is kept agitated and is caused to flow, even when it is moist.

In the accompanying drawing,

Fig. 1 is a vertical sectional view through the complete shaker;

Fig. 2 is a top plan view thereof;

Fig. 3 is a horizontal sectional view on the line 3—3, of Fig. 1;

Fig. 4 is a side elevation of the plunger weight removed, and;

Fig. 5 is a sectional view through the plunger guide taken on the line 5—5 of Fig. 1.

The body portion of the shaker is designated 1 and may comprise the usual bottle or other container for the salt to which the cap 2 is detachably secured as by screw threads. The cap is provided with a plurality of orifices 3 arranged therein, as shown particularly in Fig. 2.

Suspended from the underside of the cap is a plunger guide 4, the upper end of which is rigidly fixed to the cap, while the lower end has an abutment 5 thereon and a pointed extremity 6 below said abutment. The main portion 4 may be of some irregular shape such for instance, as is shown in Fig. 5, wherein it is represented as Y-shape but the angles of the sides are preferably obtuse, so as to avoid a caking or accumulation of the salt therein.

Slidably mounted on the guide 4 is a plunger weight 7, the opening through which approximately corresponds with the cross section of the guide 4, and said weight carries a plurality of downwardly extending fingers 8, the lower ends of which are pointed as at 9, and as shown in Fig. 3, each of these fingers is approximately of triangular shape having a straight inner edge 10, while the sides of the adjacent fingers are flared outward away from the center leaving a tapering space 11 therebetween which facilitates the downward flow of salt from within the fingers and prevents an accumulation therein.

Attached to the plunger 7 and extending upwardly therefrom are a plurality of prongs 12 which are arranged in position to pass through the orifices 3 in the cap 2, so as to keep said orifices clean of salt as well as to agitate the salt in the upper portion of the container. These prongs 12 are held in spaced relation by a ring 13 which is secured to the inner edges thereof to brace the prongs intermediate their ends.

As the shaker is shaken, the plunger 7 is reciprocated back and forth along the guide 4, which causes the prongs 12 to loosen up the salt in the upper portion of the container and force the same out through the orifices 3, likewise keeping said orifices clean, while the fingers 8 on each return movement break up the salt in the lower portion of the container and keep it loose for free flowing even when the salt in the container is moist and would otherwise cake and stick. This invention causes the salt to flow freely under all conditions.

While the invention has been described as a salt shaker, yet it may be used as a sifter or shaker for any other goods for which it is suitable, and is not limited to use only with salt.

I claim:

1. A shaker comprising a container having a cap, said cap having orifices arranged therein, a guide carried by the cap and extending into the container, a plunger slidably mounted on the guide for longitudinal movement, a plurality of prongs attached directly to the plunger and extending laterally from the sides thereof and turned upwardly beside the plunger in parallel relation in position to enter the orifices in the cap upon reciprocation of the plunger to keep said orifices open, and a ring secured to the inner edges of the prongs intermediate their upright portions and holding the prongs in proper relation to each other.

2. A salt shaker comprising a container, a cap secured thereto and having orifices therein, a plunger guide carried by the cap and extending downwardly therefrom into the container, said guide being approximately Y-shape in cross section, and a plunger slidably mounted on the guide and having prongs arranged in position to enter the orifies in the cap, the Y-shaped guide holding the plunger against turning thereon to maintain alignment between the prongs and orifices.

3. A shaker comprising a container, a plunger guide mounted therein, a plunger slidably mounted on said guide and having a plurality of downwardly extending fingers carried thereby, each of said fingers being approximately triangular in cross section and having a pointed lower end to break up the salt in the container upon the reciprocation of the plunger, the adjacent sides of the fingers being flared away from the center to prevent an accumulation of salt between the fingers.

4. A salt shaker comprising a container, a plunger guide mounted therein, a plunger slidably mounted on said guide and having a plurality of downwardly extending fingers carried thereby, each of said fingers being approximately triangular in cross section and having a pointed lower end to break up the salt in the container upon the reciprocation of the plunger, the adjacent sides of the fingers being flared away from the center to prevent an accumulation of salt between the fingers, and upstanding prongs carried by the plunger arranged in position to break up the salt in the upper portion of the container.

5. A shaker comprising a container, a cap therefor, a guide carried by the cap and extending into the container, a plunger slidably mounted on the guide and having integral downwardly extending fingers with sharpened lower ends and arranged in approximately annular form, each of said fingers being approximately triangular in cross-section, said fingers having the inner sides thereof flared away from the center.

6. A shaker comprising a container, a cap therefor, a guide carried by said cap and extending into the container, said guide having an abutment thereon spaced above the lower end portion with an extended portion below said abutment, a plunger slidably mounted on the guide above the abutment and having integral downwardly extending fingers with sharpened lower ends and arranged in approximately annular form about the extended portion of the guide, said fingers having the opposed sides thereof flared away from the guide, each of said fingers being approximately triangular in cross-section.

WENDELL B. KING.